United States Patent Office 3,509,040
Patented Apr. 28, 1970

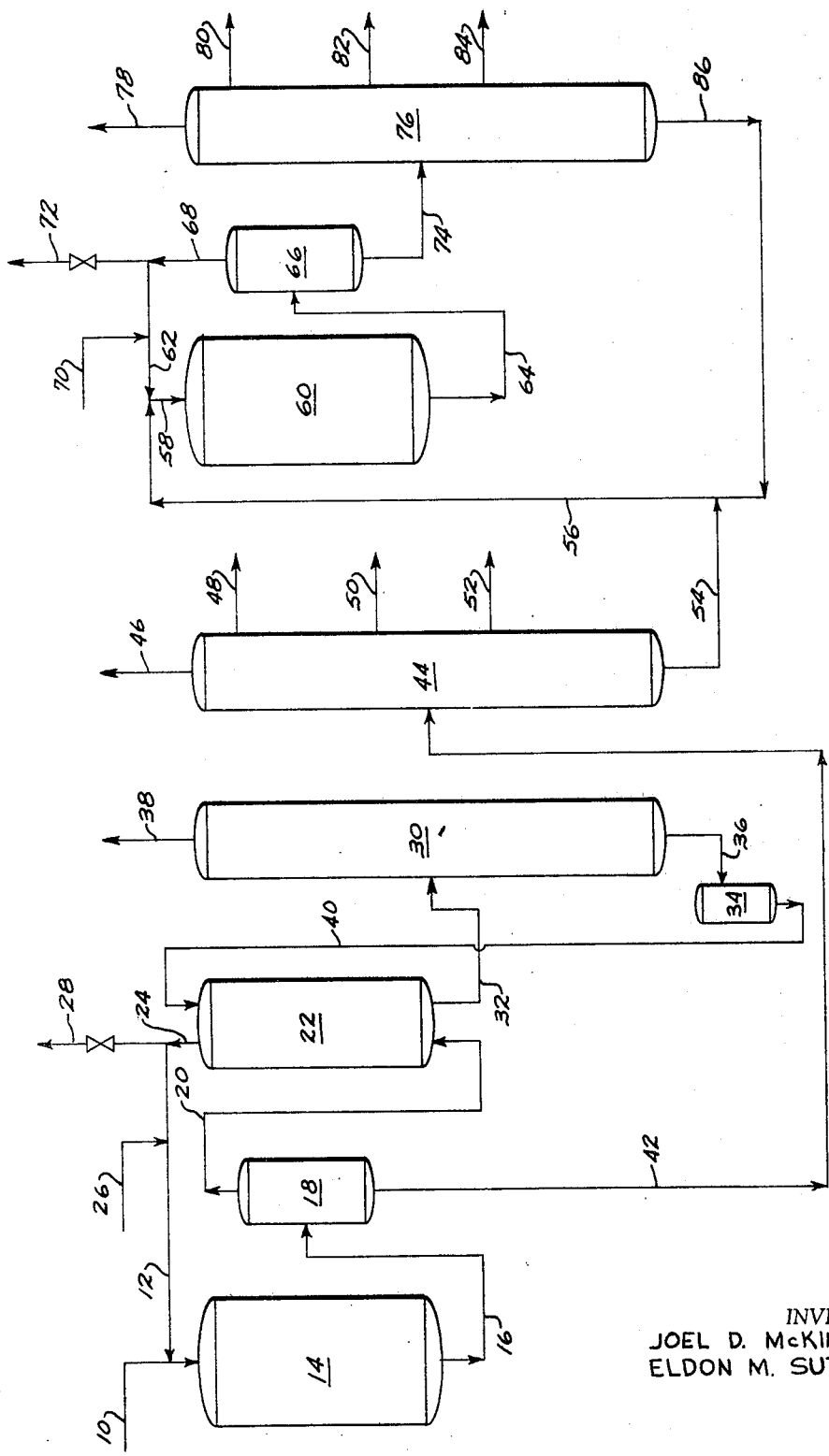

3,509,040
PROCESS FOR PRODUCING JET FUEL
Joel D. McKinney, Indiana Township, Allegheny County, and Eldon M. Sutphin, O'Hara Township, Allegheny County, Pa., assignors to Gulf Research & Development Company, Pittsburgh, Pa., a corporation of Delaware
Continuation-in-part of application Ser. No. 393,300, Aug. 31, 1964. This application Feb. 23, 1968, Ser. No. 732,470
Int. Cl. C10g *13/00*
U.S. Cl. 208—59                                          6 Claims

ABSTRACT OF THE DISCLOSURE

A process for producing high quality jet fuel from gas oils (e.g. 550° F.+ fractions) by hydrocracking the gas oil in a first hydrocracking stage, fractionating the effluent to separate the components boiling above the jet fuel-kerosene range (e.g. 550° F.+), charging only such components boiling above the jet fuel range to a second hydrocracking stage and recovering as product the jet fuel boiling range materials from the second hydrocracking stage.

---

This application is a continuation-in-part of copending application Ser. No. 393,300, filed Aug. 31, 1964, now abandoned.

Our invention relates to a process for making an improved jet fuel. More particularly our invention relates to a process for making an improved jet fuel for use in aircraft capable of speeds in excess of Mach 3.

The design of aircraft operating at supersonic speeds of Mach 3 (about 2,200 miles per hour) and greater presents problems with the cooling of the engine and the plane itself during sustained flight. Under present design concepts, it is desirable to employ, at least partially, the fuel as a coolant for a jet engine. Also an airplane flying at Mach 3 will have a skin temperature averaging about 500° F. Usually some of the heat generated at the skin is transferred to the fuel and, consequently, the bulk fuel temperature increases substantially. Thus, the bulk fuel temperature for Mach 3-4 aircraft may range from about 200° to about 400° F. depending upon the fuel tank location, insulation, duration of flight, amount of fuel and the heat capacity of the fuel. Presently employed fuels do not have the thermal stability required for these new uses. Ordinary JP grade fuels (blended kerosenes) cannot be heated much above 225° F. before gums begin to form in the ufel lines and on the walls of the fuel tanks. The proposed specification requirements for high-temperature jet fuels for Mach 3+ aircraft are shown in the following table:

HIGH TEMPERATURE FUELS

| | Future Air Force | Pratt & Whitney |
|---|---|---|
| Gravity, °API | [1] 30 | 47–53 |
| Sulfur, percent by wt | | [2] 0.1 |
| Viscosity, CS. at −30° F | [2] 15 | [2] 15 |
| Freezing Point, ° F | [2] −55 | [2] −40 |
| Heat of Combustion, B.t.u./Pound | [1] 18,400 | [1] 18,900 |
| Aromatic Content, percent by Volume | [3] | [2] 5 |
| Luminometer Number | [3] | [1] 100 |
| Thermal Stability, CFR Fuel Coker, 300 minutes: | | |
| Preheater Temp., ° F | 600 | 500 |
| Filter Temp., ° F | 800 | 600 |
| Pressure Drop (ΔP), inches Hg | [2] 5 | [2] 5 |
| Deposit Rating | [2] 2 | [2] 2 |
| Distillation, ASTM: | | |
| Over Point, ° F | [1] 350 | [1] 375 |
| End Point, ° F | [3] | [2] 550 |
| 10% | [3] | [1] 400 |
| 50% | [3] | [1] 420 |
| 90% | [3] | [2] 500 |
| Vapor Pressure at 300° F., mm. Hg | [2] 150 | |
| Vapor Pressure at 300° F., p.s.i.a | | [2] 2.7 |

[1] Minimum.  [2] Maximum.  [3] Not specified.

The above proposed characteristics were taken from Technical Report Nr ASD TR 61–728 entitled "Future Air Force Requirements for Hydrocarbon Fuels," Wright-Patterson AFB, May, 1962, and Pratt and Whitney Aircraft Specification, PWA 523–C, revised June 20, 1963.

We have found that if a gas oil is hydrocracked to convert at least about 40 percent by volume of the charge to components boiling below the initial boiling point of the gas oil charge, which hydrocracking produces a kerosene fraction unsuitable for use as a Mach 2 jet fuel, much less a Mach 3 jet fuel, unexpectedly the effluent fraction boiling above about the initial boiling point of the gas oil charge yields, upon separate hydrocracking, an extremely high quality jet fuel suitable for Mach 3 employment. In accordance with our invention, we provide a process for producing high quality jet fuel which comprises a two-stage hydrocracking operation, in the first hydrocracking stage of which a hydrocarbon, such as a gas oil, boiling above the conventional kerosene range, that is, boiling in the range from about 550° F. to about 1100° F., is contacted with hydrogen in the presence of a dual component hydrocracking catalyst to effect at least about 40 percent by volume conversion to components boiling below the initial boiling point of the charge stock, e.g., below about 550° F. The effluent is removed from the first stage and is fractionated to recover a hydrocarbon fraction boiling above about 500° F. and containing less than 0.5 percent by weight sulfur, less than 50 p.p.m. nitrogen and less than 20 percent by volume aromatic constituents. This fraction, and only this fraction, is then contacted in a second hydrocracking stage with hydrogen in the presence of a dual component hydrocracking catalyst of the type mentioned above. The effluent is removed from this second stage and is then fractionated to obtain a fraction boiling above the jet fuel-kerosene range, e.g., above about 550° F. and a fraction boiling in the jet fuel-kerosene range, e.g., from about 380° F. to about 550° F. The fraction boiling above the jet fuel-kerosene range is recycled to the second stage and the jet fuel-kerosene fraction is recovered as the improved jet fuel product. It is essential that the material charged to our second hydrocracking stage be comprised only of components boiling substantially above the jet fuel range since the presence of any substantial quantity of lower boiling materials, such as, for example, jet fuel boiling range materials charged from the first hydrocracking stage or recycled from the second hydrocracking stage, has an extremely detrimental affect upon the quality of product obtained from the second hydrocracking stage.

Generally, the process of our invention is effective to produce a second stage jet fuel product having a luminometer number ranging from at least about 75 percent up to in excess of 100 percent greater than the luminometer number of the first stage jet fuel fraction. Similarly, the second stage jet fuel product of our invention will be found to have other properties enhanced to a corresponding degree, such as, for example, smoke points increased by about 100 percent over first stage jet fuels. We have also found that this unexpectedly great enhancement of product qualities is not achieved when jet fuel boiling range materials from the first stage hydrocracker are charged to the second stage hydrocracker.

The hydrocarbon charge to the first stage of our process can be any mineral fraction boiling in the gas oil range, that is, boiling above the conventional kerosene range and usually having an initial point or over point of 550° F. and having an end point of up to about 1100° F. Preferably, we employ a gas oil fraction boiling in the range from about 600° F. to about 1050° F. The charge stock can also contain undesirable contaminants such as, for example, up to about 4 percent by weight sulfur and up to about 2000 p.p.m. nitrogen. Although it is preferred to use straight run gas oils as the charge to the first stage of our process, it is also possible to employ other charge stocks meeting the above specifications such as, for example, cycle oils from catalytic or thermal cracking operations, coke distillate gas oils and deasphalted crude oils. The particular charge stock can be derived from petroleum crude, shale oils, tar sand oils, coal hydrogenation, etc. The charge stock to our first stage can also contain substantial quantities of aromatic compounds, e.g., as high as 40 or 50 percent by volume. Usually stocks of the type mentioned above will be found to contain at least about 20 percent by volume aromatics.

As mentioned previously, the fraction charged to the second stage should have an over point broadly above 500° F. Furthermore, the sulfur content of the fraction should be less than about 0.5 percent by weight, the nitrogen content no greater than 50 p.p.m. and the aromatic content no more than about 20 percent by volume.

The catalysts employed in both the first stage and the second stage hydrocracking of our invention can be conventional hydrocracking catalysts which are broadly defined as dual function catalysts, having a hydrogenating-dehydrogenating component distended upon an active acidic cracking support. The hydrogenating-dehydrogenating component can be selected from the Group VI and Group VIII metals as well as their oxides and sulfides employed either alone or in admixture. The acidic cracking support can comprise such acidic materials as silica-alumina, silica-magnesia, silica-alumina-zirconia composites, crystalline aluminas, certain acid treated clays possessing substantial cracking activity and other acidic cracking materials. Other agents can also be added to the catalysts in order to promote their activity. These promoters can be added to the catalyst during its manufacture or during the hydrocracking operation such as by introducing it with the feed stock. We find that halides, particularly fluorine compounds, are quite suitable for promoting these hydrocracking catalysts. Thus, a typical hydrocracking catalyst which can be employed in the process of our invention is a nickel-tungsten on silica-alumina promoted with fluorine, particularly such a catalyst wherein the nickel and tungsten components are in the sulfide form. Other typical catalysts which can also be employed in our invention include nickel sulfide on silica-alumina, nickel and cobalt on silica-alumina and cobalt sulfide and chromium sulfide on silica-alumina.

In the process of our invention the operating conditions employed in the first hydrocracking stage comprise a temperature from about 700° to about 890° F., and preferably from about 760° to about 860° F.; a pressure from about 1000 to about 8000 p.s.i.g., and preferably from about 2000 to about 6000 p.s.i.g.; a liquid hourly space velocity from about 0.2 to about 10, and preferably from about 0.5 to about 2.0; and a hydrogen feed rate from about 4000 to about 50,000 standard cubic feet per barrel and preferably from about 6000 to about 15,000 standard cubic feet per barrel. Hydrogen purity can be between about 50 and 100 percent, but it is prefered that the hydrogen stream be between 70 and 100 percent. In conducting the second hydrocracking stage of our invention the operating conditions employed comprise a temperature from about 650° F. to about 850° F., and preferably from about 700° to about 800° F.; a pressure from about 500 to about 10,000 p.s.i.g., and preferably from about 1500 to about 6000 p.s.i.g.; a liquid hourly space velocity from about 0.2 to about 10, and preferably from about 0.3 to about 2.0; and a hydrogen feed rate from about 4000 to about 50,000 standard cubic feet per barrel, and preferably from about 8000 to about 15,000 standard cubic feet per barrel.

In order to explain our invention in greater detail, reference is made to the attached drawing.

In the figure a 550° to 1100° F. boiling range hydrocarbon charge stream of line 10 is mixed with the hydrogen of line 12 and introduced into hydrocracking reactor 14. The effluent from reactor 14 is passed by means of line 16 into liquid gas separator 18 wherein hydrogen is separated from the other reaction products. The hydrogen is removed from separator 18 by means of line 20 and is passed to scrubber 22 wherein it is scrubbed with diethanolamine to remove sulfur and nitrogen contaminants before the hydrogen is recycled to hydrocracking reactor 14 by means of lines 24 and 12. Make-up hydrogen is introduced into line 12 by means of line 26. A portion of the hydrogen stream from scrubber 22 is bled from the system by means of valved bleed-off line 28 connected to line 24. Spent diethanolamine solution is drawn off the bottom of scrubber 22 and is passed to diethanolamine reactivator 30 by means of line 32. The diethanolamine solution reactivated by removal of nitrogen and sulfur contaminants is then passed to hold-up tank 34 by means of line 36 and scrubber gas is bled from reactivator 30 by means of line 38. The reactivated diethanolamine is then passed from hold-up tank 34 back to scrubber 22 by means of line 40.

The liquid bottoms from separator 18 are passed by means of line 42 into fractionator 44 wherein $C_1$-$C_2$ fuel gas is removed overhead by means of line 46 and a $C_3$-$C_4$ fraction, $C_5$-380° F. naphtha fraction and a 380° to 500° F. kerosene fraction are removed as products by means of lines 48, 50 and 52, respectively. A gas oil fraction boiling above about 500° F. is also removed from the bottom of fractionator 44 by means of line 54.

The hydrocarbon fraction boiling above about 500° F. of line 54, and only such fraction, is passed by means of lines 56 and 58 into second stage hydrocracking reactor 60. A hydrogen stream is introduced into the hydrocarbon stream of line 56 by means of line 62 and is mixed with the hydrocarbon stream in line 58. The effluent stream from hydrocracking reactor 60 is removed therefrom by means of line 64 and is then introduced into flash separator 66. Separated hydrogen is removed from separator 66 by means of line 68 and is recycled to reactor 60 by means of lines 62 and 58. Make-up hydrogen is added to line 62 by means of line 70 and a portion of the hydrogen of line 68 is bled from the system by means of a valved bleed-off line 72. The liquid effluent stream from separator 66 is passed by means of line 74 to fractionator 76. A $C_1$-$C_2$ fuel gas fraction is removed overhead from fractionator 76 by means of line 78, while a $C_3$-$C_4$ fraction and a $C_5$-380° F. naphtha fraction are removed from the fractionator 76 by means of lines 80 and 82, respectively. The desired 380° to 550° F. fraction is removed from fractionator 76 by means of line 84 and is recovered as product. A 550° F.+ gas oil fraction is removed from the bottom of fractionator 76 by means of line 86 and is recycled to reactor 60 by means of lines 56 and 58.

Example I

In this example a comparison is made between a once-through, single-pass hydrocracking process and the two-stage hydrocracking process of this invention with recycle to extinction of the 550° F.+ material in the second stage. The charge stock employed was a Kuwait heavy virgin gas oil having the following inspections:

Gravity, API—22.6
Distillation ASTM–D 1160
    5% at ° F.—620
    10—665
    90—978
    95—1017
Nitrogen, p.p.m.—770
Sulfur, percent by weight—2.9
Bromine No.—4
Aromatic content, percent by volume—53

The catalyst employed in this example analyzed at a composition of 2 percent fluorine, 6 percent nickel and 19 percent tungsten supported on a Triple A silica-alumina support. The hydrocracking reactor employed was charged with 2150 ml. of 1/16-inch size pelleted catalyst. Before commencing operation the catalyst was exposed to a sulfur containing gas oil at a temperature of 750° F. and a hydrogen pressure of 1600 p.s.i.g. in the presence of from 8000 to 10,000 standard cubic feet of hydrogen per barrel of feed for a period of about 6 hours in order to sulfide the catalyst. The Kuwait gas oil was then charged to the reactor under the conditions shown in Table I below. The effluent from the reactor was then fractionated into $C_1-C_2$, $C_3-C_4$, $C_5-380°$ F., 380° to 550° F. and 550° F.+ fractions substantially equivalent to the streams of lines 46, 48, 50, 52 and 54 of the drawing. The yields of these fractions are also shown in Table I below.

After this run was made, the reactor was shut down, purged and the catalyst replaced with 2150 ml. of fresh 1/16 inch pelleted catalyst. This fresh catalyst was then sulfided in the same manner as described above and the 550° F.+ fraction from the single stage operation above was charged to the reactor and subjected to hydrocracking under the conditions shown in Table I below. Again, the effluent from the reactor was fractionated into $C_1-C_2$, $C_3-C_4$, $C_5-380°$ F., 380° to 530° F. and 530° F.+ fractions equivalent to the streams of lines 78, 80, 82, 84 and 86 of the drawing. The 530° F.+ fraction was recycled to extinction in this second stage reactor. The yields of the various fractions obtained from the second stage reactor are shown in Table I below.

The quality of the improved jet fuel obtained in accordance with the process of our invention can be seen from a comparison of the data in Table II below. In this table are shown the proposed specifications for both Mach 2 jet fuel and the high temperature jet fuel required for Mach 3 aircraft as well as the inspections of the jet fuel fractions obtained from the first and second stage reactors and inspections of a blend of both fractions. The first stage product boiled in the range from 382° to 550° F.; the second stage product boiled in the range from 380° to 530° F.; and the aliquot blend boiled in the range from 380° to 526° F.

TABLE II

| | Mach 2 Spec. | High Temp. Fuel Spec. | | Stage | | Aliquot Blend Stage I and II |
|---|---|---|---|---|---|---|
| | | Future Air Force | Pratt & Whitney | I | II | |
| Gravity, ° API | 36–48 | [1] 30 | 47–53 | 41.3 | 50.2 | 44.8 |
| Viscosity, CS. at −30° F | [2] 16.5 | [2] 15 | [2] 15 | 15.8 | 14.32 | |
| Freezing Point, ° F | [2] −55 | [2] −55 | [2] −40 | −52 | −70 | −60 |
| Heat of Combustion, B.t.u./lb | | [1] 18,400 | [1] 18,900 | 18,630 | 18,840 | |
| Smoke Point, mm | [1] 35 | | | 26 | >50 | 33 |
| Luminometer Number | [1] 75 | | [1] 100 | 58 | 104 | 68 |
| Thermal Stability, CFR Fuel Coker, 300 min.: Preheater Temp., ° F | 400 | 600 | 500 | 400 | 600 | 600 |
| Filter Temp., ° F | 500 | 800 | 600 | 500 | 800 | 800 |
| Pressure Drop (ΔP), in Hg | [2] 5 | [2] 5 | [2] 5 | 0 | 0 | 1 |
| Deposit Rating | 2 | [2] 2 | [2] 2 | 0 | 0 | 3 |
| Vapor Pressure at 300° F., mm. Hg or p.s.i.a. | | [3] | [4] | | | |
| Sulfur, percent by weight | [2] 0.1 | | [2] 0.1 | 0.005 | [5] 0.003 | 0.001 |
| Hydrocarbon Type, percent by volume: | | | | | | |
| Aromatics | | | [2] 5 | 10.2 | 1.8 | 7.0 |
| Olefins | | | | 1.7 | 0.8 | 2.1 |
| Saturates | | | | 88.1 | 97.4 | 90.9 |
| Existent Gum, Mg./100 ml | | | [2] 7.0 | 4–2 | 4–0 | 0–0 |

[1] Minimum.
[2] Maximum.
[3] 150 mm. Hg (max.).
[4] 2.7 p.s.i.a. (max.).
[5] 2.6 p.s.i.a.

TABLE I

| | Stage I | Stage II |
|---|---|---|
| Operating Conditions: | | |
| Temperature, ° F. avg | 760 | 707 |
| Pressure, p.s.i.g | 2,500 | 1,600 |
| LHSV (reactor charge) | 1.0 | 1.0 |
| Reactor Charge Gas, s.c.f./b | 9,860 | 10,000 |
| Reactor Charge Gas, percent H² | 96 | 97 |
| Make-up Gas, H², percent | 100 | 100 |

| | Basis Kuwait Gas Oil | Basis Reactor Charge | Basis Kuwait Gas Oil |
|---|---|---|---|
| Yields, percent by vol.: | | | |
| $C^3-C^4$ | 4.1 | 9.8 | 4.7 |
| Naphtha ($C^5-380°$ F.) | 29.7 | 55.9 | 26.8 |
| Kerosene (380°–550° F.) | 32.2 | [1] 50.3 | [1] 24.2 |
| Gas Oil (550° F.+) | 48.1 | None | |
| $C^1-C^2$, percent by weight | 0.3 | 0.1 | 0.05 |
| Hydrogen Consumption, s.c.f./b | 1,450 | 650 | 312 |

[1] 530° F. end point.

A comparison of the data shown in Table II above clearly demonstrates that the jet fuel obtained from the second stage hydrocracking reactor, the product of this invention, is of exceedingly high quality. First of all it has an API gravity of 50.2, a smoke point greater than 50 and a luminometer number of 104. The API gravity is well above the minimum requirement of the specifications and the smoke point and luminometer number are indicative of vastly superior combustion characteristics. The jet fuel from Stage II also passes the severe CFR coker test with no tube deposits or filter pressure drop at test conditions of 600° F. tube temperature and 800° F. filter temperature with prior stressing at 300° F. Thus, it can be seen that the jet fuel produced in accordance with our invention is an exceptionally high quality fuel of the nature defined by the severe requirements of both specifications. It will also be seen that while the kerosene or jet fuel fraction from Stage I does not meet the requirements of the high temperature specifications or the Mach 2 specifications, blending it with the extremely high quality jet fuel from Stage II also fails to produce a blended fuel, shown in the column entitled "Aliquot Blend," which meets the requirements of either the Mach 2 or High Temperature Fuel specifications, thereby indicating that the kerosene fraction of a single-pass straight-run must apparently contain sufficient undesirable constituents that they cannot be diluted sufficiently even with the high quality product of our invention to produce a fuel meeting the Mach 2 or higher specifications. It should also be pointed out that the jet fuel of our invention contains the extremely low proportion of only 1.8 percent aromatics as opposed to 10.2 percent from Stage I, while it contains the extremely high proportion of 97.4 percent saturates. It will also be noticed from a comparison of the properties of the Stage I and Stage II products that the process of our invention provides a jet fuel product having a smoke point about 100 percent greater than the smoke point of the first stage jet fuel fraction. Similarly, it will be noted that the jet fuel product of our invention has a luminometer number about 80 percent greater than the luminometer number of the first stage jet fuel fraction.

Example II

This example illustrates a two-stage hydrocracking process with recycle to extinction of the substantially 550° F.+ material in the second stage. As distinguished from the two-stage hydrocracking process of this invention, illustrated in Example I, the two-stage hydrocracking process of the present example was conducted charging to the second stage both the 380°–550° F. kerosene-jet fuel fraction from the first stage effluent as well as the 550° F.+ gas oil fraction from the first stage. The method of operation illustrated in this example is without the scope of the present invention and contrary to the requirements of the present invention.

The charge stock employed in this example was a Kuwait heavy virgin gas oil of the type described in Example I and the catalyst employed herein was also a 6 percent nickel, 19 percent tungsten and 2 percent fluorine supported on Triple A silica-alumina of the type described in Example I. Also, as in Example I, the catalyst was presulfided prior to commencing operation. The Kuwait gas oil was then charged to the first stage reactor under the conditions shown in Table III below. Again, as in Example I, the effluent from the first stage reactor was then fractionated into the essential fractions, i.e. boiling below 380° F., 380°–550° F. and 550° F.+ fractions. The yields of these fractions are shown in Table III below.

After this first stage hydrocracking the 380°–550° F. and the 550° F.+ fractions were charged to a second stage reactor containing the same quantity of fresh presulfided catalyst described above in this example and subjected to hydrocracking under the conditions shown in Table III below. Again, the effluent from the second stage reactor was fractionated into substantially the same essential fractions as the first stage effluent, i.e. boiling below 380° F., 380°–550° F. and 550° F.+ fractions. The 550° F.+ fraction was recycled to extinction in this second stage reactor. The yields of the various fractions obtained from the second stage reactor are shown in Table III below.

TABLE III

| Operating Conditions: | | |
|---|---|---|
| Reactor Pressure, p.s.i.g. | 2,500 | 1,600 |
| Reactor Temperature, ° F. | 751 | 625 |
| Space Velocity, Vol./Hr./Vol.: | | |
| Total Feed | 1.0 | 2.0 |
| Fresh Feed | 1.0 | 1.5 |
| Reactor Charge Gas: | | |
| Circulation Rate, s.c.f./b. of Fresh Feed | 10,200 | 10,000 |
| Hydrogen Content, percent | 97 | 98 |
| Conversion Per Pass, percent by Vol. | 47.4 | 75 |
| Yields, percent by Volume: | | |
| Naphtha and Lighter (<380° F.) | 24.3 | 75 |
| Kerosene/Jet Fuel (380°–550° F.) | 26.1 | 42 |
| Gas Oil (550° F.+) | 52.6 | |
| Total | 103.0 | 117 |
| Chemical Hydrogen Consumption, s.c.f./b. of Fresh Feed | | 770 |

In order to illustrate the difference in results obtained when practicing two-stage hydrocracking as illustrated in this example in comparison to the results obtained when practicing the particular two-stage hydrocracking of our invention, certain product inspection data from the first and second stages of this example as well as the first and second stages of Example I are presented in Table IV below.

TABLE IV

| | Example I | | Example II | |
|---|---|---|---|---|
| Stage | I | II | I | II |
| Gravity, °API | 41.3 | 50.2 | 41.3 | 46.9 |
| Sulfur, percent by weight | 0.005 | 0.003 | 0.0005 | |
| Hydrocarbon Type, percent by Volume: | | | | |
| Aromatics | 10.2 | 1.8 | 10.5 | 4.0 |
| Olefins | 1.7 | 0.8 | | |
| Saturates | 88.1 | 97.4 | | |
| Freezing Point, ° F. | −52 | −70 | −60 | |
| Smoke Point, mm | 26 | >50 | 25 | 37 |
| Luminometer Number | 58 | 104 | 58 | 78 |

A comparison of the data shown in Table IV above clearly demonstrates the necessity for eliminating jet fuel boiling range material from the charge to the second hydrocracking stage in accordance with our invention. Thus, it will be noted that although the second stage jet fuel boiling range products obtained in accordance with the techniques of either Example I or Example II are, by definition, of substantially the same boiling range and have substantially the same API gravity, the second stage jet fuel product from Example I is of substantially higher quality than the second stage jet fuel product of Example II. These data illustrate quite clearly that the presence of jet fuel boiling range material in the charge to the second hydrocracking stage, as illustrated by the operation of Example II, is effective to prevent formation of the unexpectedly high quality product obtained in accordance with our invention, as illustrated by Example I. Thus, it will be seen that it is necessary to charge only materials boiling above the jet fuel boiling range to the second hydrocracking stage in accordance with our invention in order to provide the exceptionally high quality jet fuel product of our invention as illustrated in Example I. Specifically, it will be noted that the process of our invention, illustrated by Example I, was effective to provide a second stage jet fuel having a luminometer number of 104—almost 80 percent higher than the luminometer number of the first stage jet fuel fraction (58), while the process of Example II produced a second stage jet fuel having a luminometer number of only 78—less than 35 percent higher than the first stage luminometer number.

We claim:
1. An improved process for the production of a high quality jet fuel which comprises hydrocracking in a first hydrocracking stage, a hydrocarbon boiling in the gas oil range while in contact with hydrogen and a dual functional hydrocracking catalyst to effect at least about 40 percent by volume conversion to components boiling below the initial boiling point of the charge and to provide a fraction boiling above about 550° F. and containing less than about 0.5 percent by weight sulfur, less than about 50 p.p.m. nitrogen and less than about 20 percent by volume aromatic constituents, fractionating the first stage effluent to separate this fraction boiling above 550° F. from lower boiling materials, charging this fraction in the substantial absence of any lower boiling materials to a second hydrocracking stage and hydrocracking this fraction while in contact with hydrogen and a dual functional hydrocracking catalyst, fractionating the second stage effluent to obtain a fraction boiling in the jet fuel-kerosene range and a fraction boiling above the jet fuel-kerosene range, recycling to the second hydrocracking stage in the substantial absence of any lower boiling materials the fraction boiling above the jet fuel-kerosene range and recovering the jet fuel-kerosene range fraction as product.

2. The process of claim 1 wherein the hydrocarbon is a gas oil boiling in the range from about 550° F. to about 1100° F., the fraction charged to the second hydrocracking stage boils above about 550° F. and the jet fuel-kerosene fraction boils in the range from about 380° F. to about 550° F.

3. The process of claim 1 wherein the catalysts comprise a hydrogenating-dehydrogenating component distended on an active acidic cracking support, the operating conditions employed in the first hydrocracking stage include a temperature from about 700° to about 890° F., a pressure from about 1000 to about 8000 p.s.i.g., a space velocity from about 0.2 to 10 volumes of hydrocarbon per volume of catalyst per hour and a hydrogen feed rate from about 4000 to about 50,000 s.c.f./b. and the operating conditions employed in the second hydrocracking stage include a temperature from about 650° F. to about 850° F., a pressure from about 500 to about 10,000 p.s.i.g., a space velocity from about 0.2 to about 10 volumes of the fraction boiling above 500° F. per volume of catalyst per hour and a hydrogen feed rate from about 4000 to about 50,000 s.c.f./b.

4. The process of claim 3 wherein the hydrogenating-dehydrogenating component of the catalyst is selected from the group consisting of Group VI and Group VIII metals and the oxides and sulfides thereof.

5. The process of claim 4 wherein the catalysts are promoted with a minor amount of a halogen.

6. The process of claim 1 wherein the catalysts comprise nickel and tungsten distended on silica-alumina and promoted with fluorine.

References Cited

UNITED STATES PATENTS 3,132,087   5/1964   Kelley et al. _____ 208—60

DELBERT E. GANTZ, Primary Examiner

A. RIMANS, Assistant Examiner

U.S. Cl. X.R.

208—60, 111

PO-1050
(5/69)

UNITED STATES PATENT OFFICE
CERTIFICATE OF CORRECTION

Patent No. 3,509,040          Dated April 28, 1970

Inventor(s) Joel D. McKinney and Eldon M. Sutphin

It is certified that error appears in the above-identified patent and that said Letters Patent are hereby corrected as shown below:

Column 1, line 49, "ufel" should be --fuel--.

Column 5, table I, line 64, "$H^2$" should be --$H_2$--; line 65, "$H^2$" should be --$H_2$--; line 70, "$C^3-C^4$" should be --$C_3-C_4$--; line 71, "$C^5$" should be --$C_5$--; and line 73, "$C^1-C^2$" should be --$C_1-C_2$--.

Column 5 and 6, table II, "Deposit Rating" under column marked "Mach II Spec", "2" should be --$^2$2--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents